United States Patent [19]

Girdley

[11] Patent Number: 4,776,566
[45] Date of Patent: Oct. 11, 1988

[54] RAISED HARDFACE OVERLAY VALVE SEAT

[75] Inventor: Harry W. Girdley, Louisville, Ky.

[73] Assignee: Henry Vogt Machine Co., Louisville, Ky.

[21] Appl. No.: 72,114

[22] Filed: Jul. 10, 1987

[51] Int. Cl.[4] .............................................. F16K 3/00
[52] U.S. Cl. .................................... 251/368; 251/328; 251/359; 137/15; 29/157.1 R
[58] Field of Search ....................... 251/368, 359, 328; 137/15, 315; 29/157.1 R

[56] References Cited

U.S. PATENT DOCUMENTS

| | | | |
|---|---|---|---|
| 2,448,483 | 8/1948 | Bassett | 251/359 |
| 3,982,864 | 9/1976 | Cain | 29/156.4 R |
| 4,377,892 | 3/1983 | Gonzalez | 251/359 |
| 4,467,510 | 8/1984 | Kinoshita et al. | 29/157.1 R |

FOREIGN PATENT DOCUMENTS

0187663 11/1983 Japan ...................................... 251/359

Primary Examiner—A. Michael Chambers
Attorney, Agent, or Firm—William R. Price

[57] ABSTRACT

A raised hardface overlay valve seat, fused around the periphery of the port of a valve, having an inverted frustoconical body cavity and an inverted frustoconical plug inserted into said cavity in sealing engagement therewith. A major advantage of the raised hardface overlay seat is that it has a taper conforming to the taper of the plug and as a consequence, reduces the area in contact with the plug and effectively intensifies the sealing stress that can be generated between the plug and the seats by a downward force. The plug may be used with lapping compound to lap the seats, both prior to service and in the field. Sufficient space is allowed in the cavity for a substantial relap life.

20 Claims, 6 Drawing Sheets

FIG 4
SECTION A-A

RAISED HARDFACE OVERLAY VALVE SEAT

FIELD OF THE INVENTION

This invention relates to metallic valves. More specifically, this invention relates to plug valves of the quarter-turn variety and to plug valves which move vertically within the valve cavity to open and close the valve, paralleling the traditional gate valve design.

BACKGROUND OF THE PRIOR ART

Applicant is aware of the following prior art:

| U.S. PAT. NO. | INVENTOR | DATE |
| --- | --- | --- |
| 4,239,185 | Lowe | 1980 |
| 3,743,556 | Breton, et al | 1973 |
| 3,916,506 | Wolf | 1975 |
| 3,864,124 | Breton, et al | 1975 |
| 4,194,040 | Breton, et al | 1980 |

SUMMARY OF THE INVENTION

A raised hardface overlay valve seat is fused onto the metallic body surrounding a port of the opposed sides of the frustoconical wall of the body cavity of a valve, so that the area of contact of the metal plug, having an inverted frustoconical surface, which is parallel to the frustoconical wall of the body cavity, is limited to the area of the raised seats. Thus, the plug seals the flow-through passage when it is in engagement with the seats and allows flow through the body of the valve when the plug is out of engagement with the hardface overlay seats. The invention is in two embodiments. One involves a quarter-turn plug valve of the type previously disclosed and claimed by Lowe, in U.S. Pat. No. 4,239,185, and the other involves a gate type plug valve with a sealing plug which need not turn, but which moves vertically in response to the rotation of the valve handwheel/yoke nut assembly.

DESCRIPTION OF THE PREFERRED EMBODIMENT

The invention is applicable to two embodiments of plug valves.

QUARTER-TURN VALVE

Figure 1:
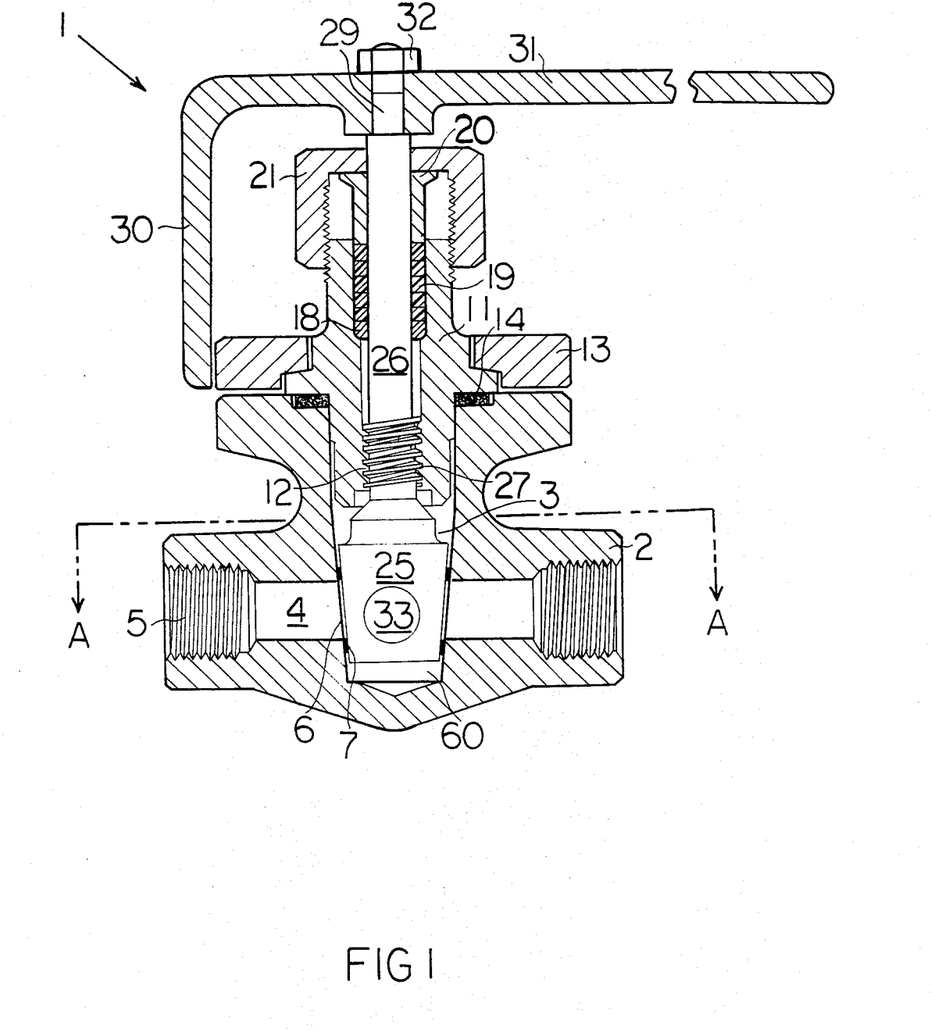
FIG. 1 is a view in perspective, with parts in section, of the hardface overlay valve seat of this invention installed on a quarter-turn valve.
Figure 3A:
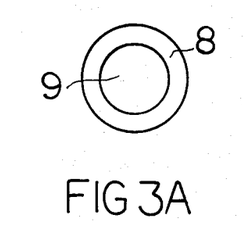
FIGS. 3A and 3B illustrate two views of the cloth-back component, including a fibrillated polymer having hardfacing alloy particles embedded therein, which has been cut and shaped to fit the periphery of the port of the valve.
Figure 3B:
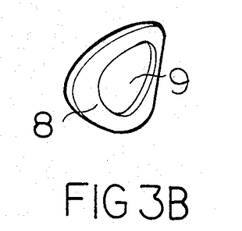
Figure 5:
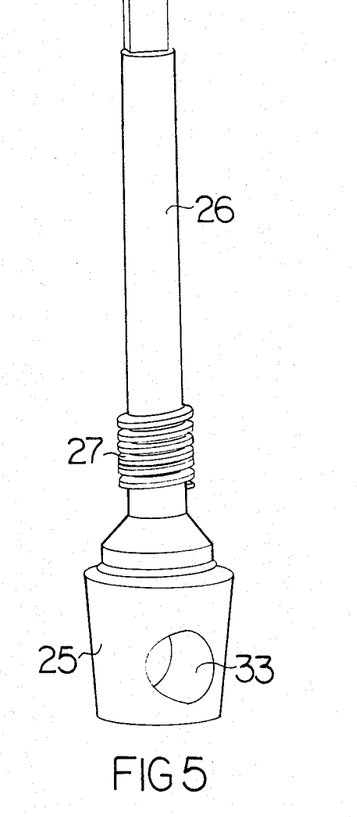
FIG. 5 is a perspective view of the plug with a permanently-attached threaded stem for the quarter-turn valve of FIG. 1.
Figure 6:
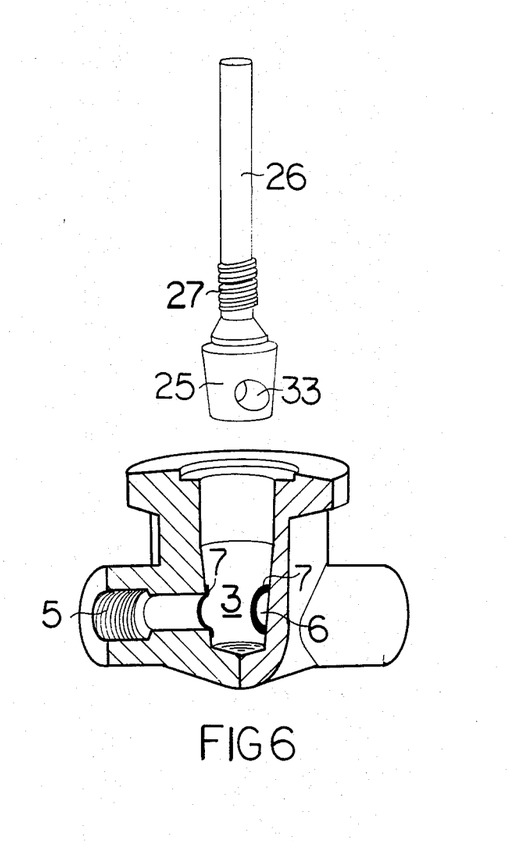
FIG. 6 is an exploded perspective view of the quarter-turn valve of FIG. 1, with the stem and plug raised for purposes of illustration.

One embodiment relates to a quarter-turn through-flow plug valve of the type disclosed and claimed by Lowe, in U.S. Pat. No. 4,239,185. This valve is illustrated in FIG. 1 and the valve stem for use with this valve is illustrated in FIG. 5. The valve 1 consists of a body 2, having a cavity 3 of an inverted frustoconical shape. The through-flow passage 4 extends from the threaded portion 5 to port 6 into the cavity. The port 6 is surrounded by a hardface raised seat 7 which extends from the wall of the cavity 3 toward the plug 25, but does not extend into the through-flow passage 4. The hardface raised seat is formed from a fabric-backed hardface composite 8 (FIGS. 3A and 3B) which will be described in more detail hereinafter. Suffice it to say that the composite is cut so as to form an opening 9 to conform to the port 6 and the hardface cloth composite is adhesively secured, in a preferred embodiment, to the periphery of port 6. The metal 10 surrounding the port is prepared by grit blasting or by pickling, so as to accept the fabric-backed hardface composite. A bonnet 11, containing threads 12, is fitted into the body 2 of the valve and a bonnet flange 13 is secured to the body portion by bolts, not shown. A spiral-wound gasket 14 is inserted between the body and the bonnet to prevent leakage around this area of contact. The plug 25 contains a through-flow passage 33 and threads 27 attached to the unitary stem 26.

ASSEMBLY

During assembly, stem 26 is fitted into bonnet 11 so that stem threads 27 engage bonnet threads 12. The plug is fitted into the frustoconical cavity 3 so that the through-flow passage 33 extends perpendicularly to the major axis of the through-flow passage 4 of body 2. Bonnet 11 is turned in relation to stem 26 which lowers the plug 25 in the cavity 3. When the wall of the frustoconical plug sealingly engages the raised surface of valve seat 7 (closed position), bonnet flange 13 is placed over the assembled stem and bonnet and bolted to the body 2. This assures proper sealing force of the plug 25 against the seats 7 and proper orientation of the through-flow passages 33 and 4 in the closed position. In this embodiment, the plug and the stem are unitary, i.e. machined from a single piece of metal. As illustrated in FIG. 1, the stem is surrounded by a series of packing rings 19, which is held in position by a packing gland 20, which is secured to the bonnet 11 by a packing nut 21. A metal packing ring 18 prevents extrusion of the packing rings around the stem 26. The stem 26 extends through the bore of the packing nut 21 and is attached by a handle 30 (shown 90° displaced for purposes of illustration) which extends over into a lever arm 31 and is held in place by a lock nut 32. The end of stem 26 is machined square as shown in FIG. 5 to engage the square bore 29 of lever arm 31. As previously indicated, the lever arm turns only one-quarter of a turn from open (limited by a stop pin, not shown) to valve closure against seat 7. The plug, in closed position (as shown in FIG. 1) wedges across the raised hardface seat 7 on either side of the cavity. Since the hardface seat is fused onto the wall of the valve body cavity surrounding the port, the valve can accommodate high temperatures and does not require a great deal of torque to turn from open to closed position. This is because the only contact of the plug is in the vicinity of the raised seats 7 and turning of the valve plug 25 a quarter of a turn tends to raise the plug to an area of smaller diameter, therefore relieving the compression of the plug against the seat 7. This allows for easy movement from closed to open. In closing the valve, the movement of the lever arm is in the opposite direction, which turns the through-flow passage 33 away from the port 6 and lowers the plug 25 as it is turned into wedging position against the raised seats 7, thus sealing the valve against flow therethrough.

GATE TYPE PLUG VALVE

Figure 8:
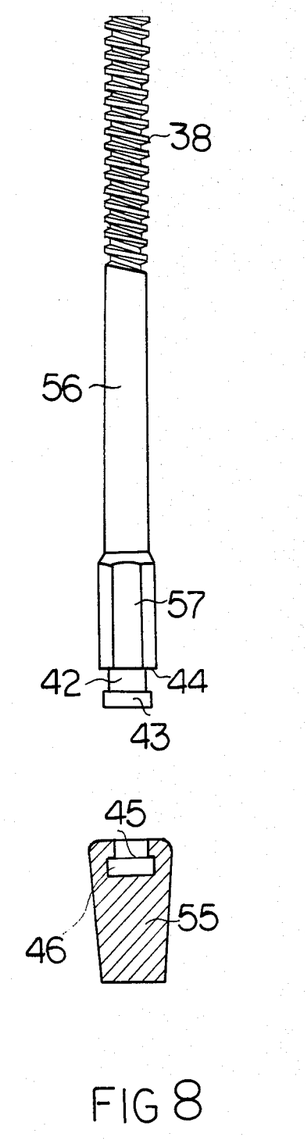
FIG. 8 is an exploded, elevational view, with parts in section, of a valve stem and a plug of the gate type plug valve of FIG. 2.

The gate type plug valve is illustrated in FIG. 2 and again consists of the valve body 2, containing the inverted frustoconical cavity 3 and a through-flow passage 4, extending to the threaded portion 5 and the port 6. Again, surrounding the port is the hardface raised seat 7. The construction, however, of the stem differs somewhat, since, in the gate type plug valve, the plug 55 can rotate freely when disengaged from valve seats 7. Rotation of the handwheel/yoke nut assembly causes the nonrotating stem 56 to lower and lift the plug vertically in and out of engagement with the seats 7. This is accomplished by means of a valve stem 56, having a hexagonal guide member 57 near its base, which fits into a threaded bushing 28 with an internal hexagonal hole 15, mounted in the bonnet 11 of the valve. The up and down movement of the plug 55 is initiated by rotation of the handwheel/yoke nut assembly 36 and 23. The stem 56 is restrained from rotation by its hexagonal guide 57 engaging in the fixed hexagonal bushing 28 and shaped hole 15. Thus, rotation by the handwheel/yoke nut 36 and 23, engaged with stem thread 38, causes the stem 56 to move in an upward or downward motion, depending on handwheel/yoke nut rotation direction. Referring to the stem and plug, these are shown in FIG. 8. The stem 56 is an integral piece with threads 38 at the top, to engage with the threads, not illustrated, of the yoke nut 23, upon rotation of the handwheel 36.

The hexagonal guide 57 is cut away to form a shoulder 44 and a neck portion 42, which terminates in a button 43. The button slides into the U-shaped slot 46 and the neck portion 42 slides into the collar slot 45, extending to the top surface of the plug 55.

Figure 2:
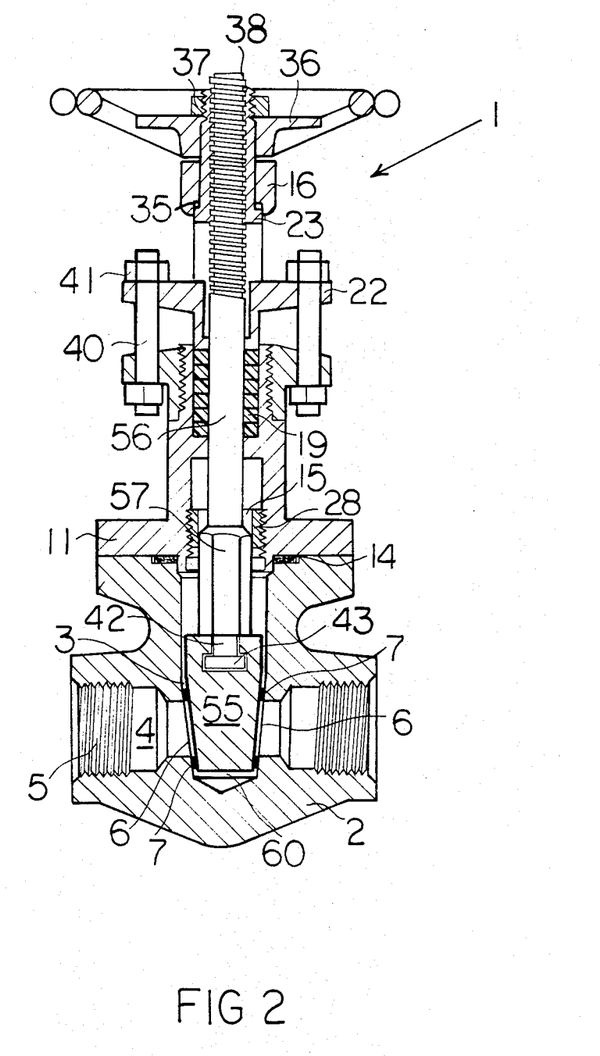
FIG. 2 is a sectional view of the raised hardface overlay improved valve seat of this invention in place in a gate type plug valve.

The handwheel/yoke nut assembly is located outside of the valve portion proper and is supported by means of a yoke 16.

The bonnet 11 is connected to the body 2 by bonnet bolts, not shown, and the valve stem 56 is surrounded by packing rings 19 retained by packing gland 22. The packing gland 22 is held in position by means of gland bolts 40 and gland nuts 41.

The yoke nut 23 is separated from the yoke 16 by the bearing ring 35 and the handwheel is connected to the yoke nut by means of jamb nut 37. As is shown, space 60 is left in the bottom of the valve cavity to allow for relapping of the hardface raised seats 7.

Figure 7:
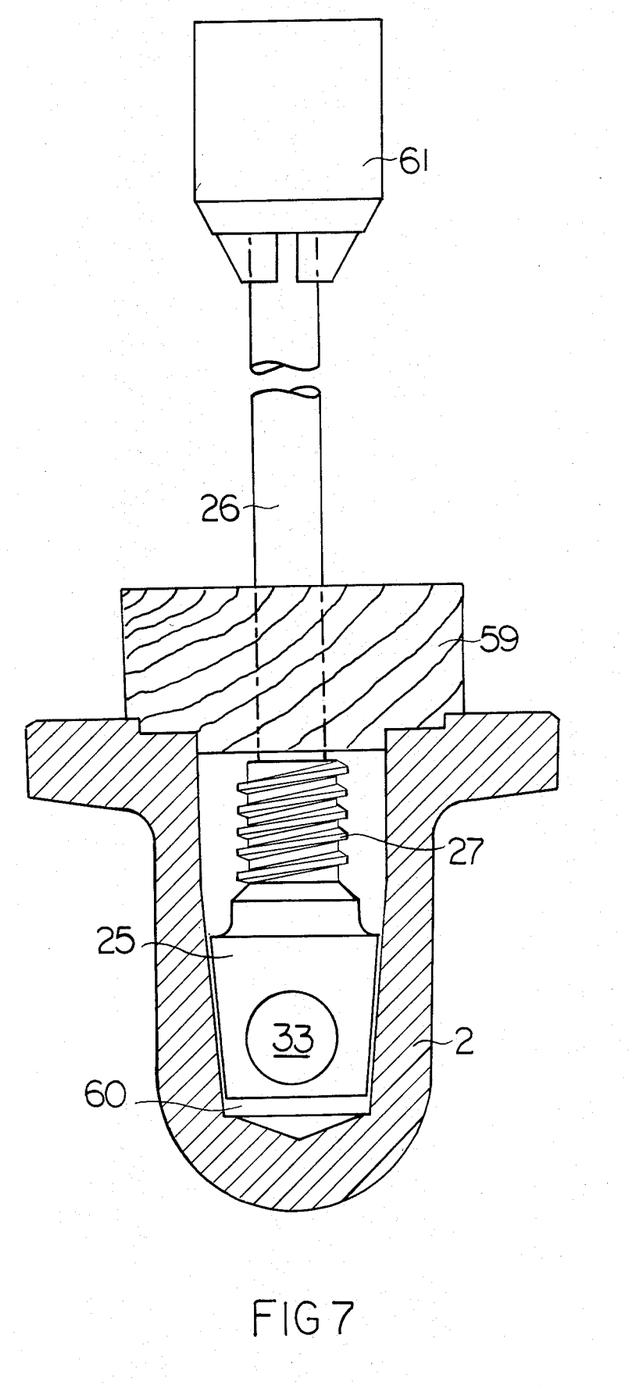
FIG. 7 is a sectional view, illustrating the lapping guide and the relationship of the valve plug and stem in field lapping of the raised hardface overlay valve seats of this invention.
Figure 9:
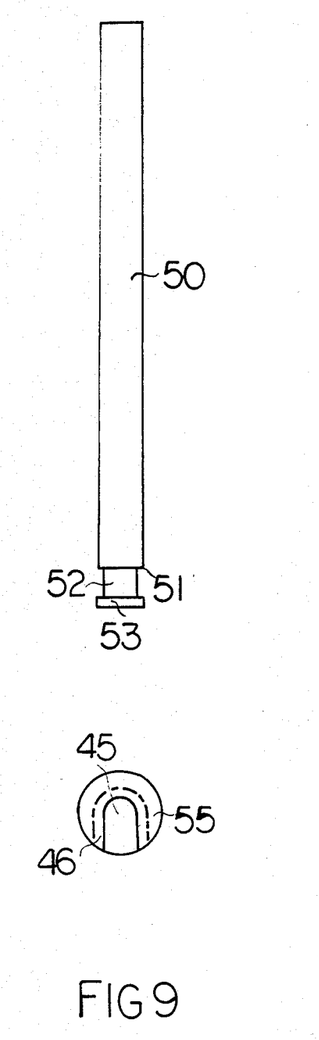
FIG. 9 is an elevational view of a shaft of a lapping tool and a top view of the plug of the gate type plug valve.

The tools for affecting the relapping procedure are shown in FIG. 7 and in FIG. 9. In the case of the quarter-turn valve, a lapping fixture 59 is fitted over the body 2 of the valve and this, as is illustrated, may be made of plastic, wood or metal. The purpose of the lapping guide 59 is to maintain the stem in proper orientation during rotation of the plug 25 at low speeds against the surface of the raised seats 7. As is shown, the stem in this case extends through the bore of the lapping guide to a chuck 61, which is driven at low speeds by a variable-speed drill (not shown). In the case of the gate type plug valve, a special fixture is used, involving a shank 50, again with a cut at the bottom to form a shoulder 51 and a neck 52, terminating in a U-shaped button 53. The U-shaped button 53 fits into the U-shaped slot 46 and the neck portion 52 fits into the collar slot 45, with the shoulder portion resting on the upper surface of the plug 55. The U-shaped button 53 fixes the plug to the fixture 50 and thus rotation of the fixture 50 turns the plug 55 within the valve body cavity and against the seat surfaces 7.

In the case of the quarter-turn valve, the regular plug 25 and valve stem 26 are used. This is illustrated in FIG. 7, in use with the lapping guide 59. Lapping guide 59 may be used as illustrated in FIG. 7.

RAISED HARDFACE OVERLAY VALVE SEAT

The hardface overlay raised valve seat 7, according to a preferred form of this invention, is prepared from a fabric backed hardface alloy composite. Such composites have been described in U.S. Pat. Nos. 3,743,556; 3,916,506; 3,864,124 and 4,194,040. The process of forming the composites is also described by Shewell, in *Metal Progress*, November, 1983, pages 1-6. A hardface alloy is one having a solidus temperature lower than the metal of the material to which it is to be joined and which, in the molten state, wets the metal and contains a powdered filler, having a solidus temperature higher than either the metal to which it is to be joined or of the hardface alloy and which is wetted by the molten hardface alloy.

In order to control the shape of the seat as it is applied around the periphery of the port 6, a fabric-backed hardface composite is formed in which the fabric consists of fibrillated polytetrafluoroethylene. The metal particles are mixed into the fibrils of polytetrafluoroethylene (Teflon ®) * which entrap the powder particles. Many different alloys can be utilized (see Shewell, loc. cit.). However, in a preferred embodiment, a nickel-chromium-boron alloy is embedded into a fibrillated polytetrafluoroethylene and formed into a fabric-like material. A cobalt alloy powder is mixed with the fibrillated polytetrafluoroethylene and the two sheets, or lamina, of the composite are joined together and formed into a single sheet. Thereafter, the laminated hardface composite is cut into the desired shape, as is shown in FIG. 3 (see also Shewell).

* Registered trademark of E. I. duPont de Nemours

Breton, in U.S. Pat. No. 3,864,124 and in 4,194,640, uses the words "braze alloys" and "hardface alloys" almost synonymously. He lists a series of intermetallic compounds that could be used as the hardface powdered component of the hardface overlay and quotes the *Braze Manual of the American Welding Society* as to the characteristics of a braze alloy. (See also Baumeister, loc. cit.).

The powdered materials, in the past, have included various refractory materials, as for example, titanium carbide and the like. However, it has been found that cobalt particles tend to give to the overlay antigalling and corrosion protection characteristics. Thus, the overlay material may be described as one with islands of cobalt in a matrix of nickel-chrome-boron alloy.

Figure 4:
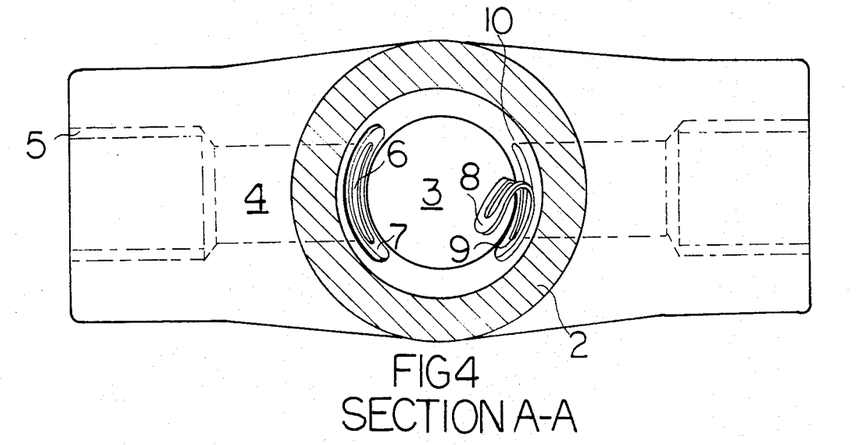
FIG. 4 is a sectional view, taken along Section A—A of FIG. 1, with the plug removed and part of the cloth-back component pulled away on one side to show the metal prepared for installation of the hardface cloth-back composite and the complete composite adhesively secured onto the prepared metal surface surrounding the valve port on the other side of the valve cavity.

Once the fabric particle component is cut to the desired shape, it is adhesively secured to the treated, prepared metal 10, FIG. 4, surrounding the port 6, by glue, shellac or the like.

The valve body base metal 10 is preferably prepared by an acid pickling treatment or by a grit blast, as described by Shewell and as is well known in the art.

Thereafter, the entire treated valve body is heated in a hydrogen atmosphere or other controlled atmosphere at temperatures so as to vaporize the Teflon ® or polytetrafluoroethylene and to braze the nickel-chromium-boron alloy and the cobalt particles and fuses them to the steel valve body surface. While the furnace brazing atmosphere is controlled, there are other methods of applying hardfacing, such as laser beams, plasma-arc welding, induction brazing, diffusion techniques, vacuum brazing and the like (see Marks', loc. cit.).

The semi-finished valve body has a raised hardface overlay alloy seat fused to the wall of the metal of the body cavity. The raised hardface overlay alloy seat extends from the wall of the body cavity 3, toward the plug 25. The seat 7 does not extend through the port 6 into the through-flow passage 4. This is of considerable importance, since there is no possibility of developing a leak or cavitation between the seat 7 and the wall of the port 4, as has been the case with the tubular valve seats in which the tube extends into the through-flow passage.

Thereafter, the raised seat is machined, lapped by conventional processes and assembled in the factory. The valve is ready for installation thereafter in the field.

FIELD LAPPING

One of the major advantages of the raised hardface overlay valve seats of this invention resides in the fact that the valves can be lapped in the field.

As previously indicated, the plugs 25 and 55 can be used as the lapping tool and, in the case of the quarter-turn valve, the plug 25 and valve stem 26 are utilized with the lapping guide 59, illustrated of wood (see FIG. 7).

In order to field lap the valves, it is necessary, of course, to take the valve out of service and to remove the bonnet flange and the bonnet and the valve stem 26. The stem 26 is then removed from the bonnet 11. Thereafter, the valve stem 26 and plug 25, in the case of the quarter-turn valve, are inserted through the bore in the lapping guide 59, which is attached to the flange of the valve body 2. Lapping compound is applied directly to the plug and the stem 26 is inserted into a chuck 61 and driven at low speeds, in contact with the surface of the seats. Various commercial lapping compounds are available, but a 180 grit, water- or oil-based silicon carbide material is preferred. It is also possible, of course, to use diamond powder in an oil or water base as the lapping compound (see Marks',loc. cit.).

FIELD ASSEMBLY

Since the lapping of the seats with the plug changes the orientation of the through-flow passage 33 of the plug 25 with the axis of the through-flow passage 4 of the valve body 2, it is necessary, in the case of the quarter-turn valve, to reassemble the valve after lapping. This involves orienting the through-flow passage 33 of the plug 25 at right angles to the major areas of the through-flow passage 4 of the body 2. The bonnet 11 is then turned in relation to stem 26, thereby moving plug 25 downward so that it again sealingly engages seat 7. This means that the frustoconical wall of plug 25 is in sealing engagement with the raised surface of the hardface valve seat 7. Thereafter, the bonnet flange 13 is fitted over the stem and bonnet assembly and bolted to the valve body. This, then, assures proper orientation of the plug 25, through-flow passage 33 and through-flow passage 4, in the position of valve closure, even after one or more lapping procedures.

As previously mentioned, there is an area of space left in the bottom of the valve cavity 3, which is designated by numeral 60 as the relap life. This space, then, allows for the valve to be relapped several times in the field before the valve plug finally contacts the bottom of the valve cavity.

As previously mentioned, the arrangement for a valve lapping tool for the gate type plug valve is somewhat different than the quarter-turn valve, since the stem 56 is not permanently attached to the plug 55. Therefore, a shaft 50 is provided which does not have the hexagonal guide means 57, but which has a cutaway portion, forming a shoulder portion 51, a neck portion 52, and terminating in a U-shaped button 53, which slides into the U-shaped slot 46. The throat portion 52 then slides through the collar slot 45 and the shoulder 51 of the shaft rests on the upper surface of the plug 55. The U-shaped button 53 engages the plug to the shaft, thus allowing the shaft to turn when connected to chuck 61 to turn the plug 55 with the lapping compound, allowing the fine finish of the hardface overlay seats and mated plug. Again, this allows for relapping of the seats in the field.

Many valve modifications will occur to those skilled in the art from the detailed description hereinabove given. Such description is meant to be nonlimiting, except insofar as to be commensurate in scope with the appended claims.

I claim:

1. A valve, comprising:
   A. a metallic body, having
      1. a body cavity, defining an inerted frustoconical wall;
      2. a through flow passage; and
      3. a port on each of the opposed sides of the frustoconical wall of said body cavity, said port communicating with said body cavity and through said through flow passage;
   B. a metal plug, havig an inverted frustoconical surface parallel to the frustoconical wall of said body cavity and extending into said body cavity across said through flow passage;
   C. hardface overlay raised seats, fused onto the metallic body surrounding said port on each of the opposed sides of the frustoconical wall of the body cavity and extending beyond the body wall into the body cavity, toward said plug, said valve seats comprising:
      1. a brazing, hardface alloy powder, having a solidus temperature lower than the metal ot said body and which, in the molten state, wers the metal, and 2. a powered filler, having a solidus temperature higher than the metal of the metallic body or of the hardface alloy which is wetted by the molten hardface alloy;

D. said raised hardface overlay seats having been machined and lapped with said metal plug inside said body cavity, into perfect mating engagement with said plug;

E. operating means for moving the plug in the body cavity out of engagement with the hardface overlay seats surrounding the ports of the through flow passage, to establish flow through the body.

2. A valve, as defined in claim 1, in which said operating means raises the plug vertically out of engagement with the seats of the through-flow passage, without rotation of the plug.

3. A valve, as defined in claim 1, in which said operating means includes a valve stem in operative engagement with said plug, which comprises:

A. attachment means for attachment of said valve stem to said plug;

B. an elongated shank;

C. guide means on said shank for guiding said stem and plug vertically; and

D. threads responsive to rotation for imparting a vertical movement to said plug and stem.

4. A valve, as defined in claim 3, in which said plug contains a slot at the top for the releasable reception of the valve stem.

5. A valve, as defined in claim 4, in which said valve stem contains a button for engagement with the slot at the top of said plug, said button resembling an inverted T in cross section.

6. A valve, as defined in claim 3, in which said threads are on the upper end of said stem.

7. A valve, as defined in claim 6, in which said operating means includes a yoke, mounted outside the body of the valve and which includes a yoke nut containing threads for engagement with the threads on said valve stem.

8. A valve, as defined in claim 7, in which said operating means includes a handwheel in operative connection with said yoke nut.

9. A valve, as defined in claim 1, in which said plug is formed with a transversely-extending passage extending through it.

10. A valve, as defined in claim 9, in which said operating means includes means for simultaneously rotating the plug in the body cavity, between the seats and moving it transversely of the ports in the body in the direction of increasing diameter of the taper of the plug, so as to turn the plug from engagement with the hardface overlay seats surrounding the ports of the through-flow passage and to establish flow through the body and the plug and relieve the tightness of the sealing relation of te plug with the seats.

11. A valve, as defined in claim 1, in which said operating means includes a bonnet, rigidly mounted on said body, and a stem, in threaded engagement with said bonnet, said stem being connected to said plug.

12. A valve, as defined in claim 1, in which the hardface alloy of the valve seat includes nickel, boron and chromium.

13. A valve, as defined in claim 1, in which the powdered filler includes cobalt.

14. For use with a valve body, having a metallic body, including a cavity defined by an inverted frustoconical wall, a through-flow passage and ports emptying into said cavity, with raised, hardface overlay seats surrounding said ports and a frustoconical plug extending into said cavity and contacting said raised seats, A. a seat-lapping tool, for the field lapping of said valve seats with said plug, comprising:

1. attachment means for attachment of said tool to said plug;

2. an elongated shaft;

3. means for rotating said tool and said plug at low speed against the hardface overlay seats surrounding said ports; and 4. a shaft alignment guide.

15. A seat-lapping tool, as defined in claim 14, in which said attachment means involves a U-shaped button which fits into a U-shaped slot at the top of the plug, so as to provide for rotation of the plug with the shank of said tool.

16. A hardface raised valve seat-lapping tool, as defined in claim 14, in which said rotation means comprises a chuck attached to the shank of said tool.

17. A process for field lapping of raised, hardface overlay valve seats on an inverted frustoconical wall of a valve body cavity, which comprises the steps of;

A. placing the valve out of service;

B. disassembling the valve;

C. removing the valve plug and stem;

D. applying lapping compound to the plug;

E. inserting the valve plug into the body cavity of the valve;

F. rotating the valve plug at low speeds with the lapping compound in contact with the surface of said raised valve seats;

G. removing the plug and cleaning the lapping compound from said surfaces;

H. reassembling the valve;

I. placing the valve back in service.

18. A process, as defined in claim 17, which involves the additional step of aligning the shaft attached to said plug and maintaining the alignment of said shaft and of said plug during the lapping operation.

19. A process for fusing a raised, hardface overlay valve seat onto the surface surrounding the port of a metallic valve body, which comprises the steps of;

A. treating the surface surrounding the port by pickling or grit blasting;

B. cutting a cloth-like, flexible, nonwoven preform to conform precisely with the area of the prepared surface surrounding the port;

C. said preform comprising;

1. a brazing, hardface alloy powder, having a solidus temperature lower than the metal of said body and which, in the molten state, wets the metal;

2. a powdered filler, having a solidus temperature higher than the metal of the metallic body or of the hardface alloy and which is wetted by the hardface molten alloy; and 3. a fibrillated organic binder for the brazing powder and for the filler;

D. adhesively securing said preform in position on said treated surface;

E. heating the area to a temperature sufficient to decompose and remove the organic binder, melt the brazing alloy, fuse the particulate material and bond it to the pretreated surface;

F. cooling the product to obtain a valve with fused, hardface raised seats;

G. machining or grinding the seats;

H. inserting a plug into contact with said fused hardface raised seats;
I. rotating the valve plug at low speeds with lapping compound, in contact with the surface of said raised valve seat;
J. removing the plug and cleaning the lapping compound from said surface; and
K. assembling the valve.

20. The process, as defined in claim 19, wherein the fusible particulate material involves two constituents;

A. a hardface alloy of nickel, chromium and boron;
B. a wear-resistant powder containing cobalt;
C. heating said hardface alloy to its melting point temperature so that the melted material flows into the interstices between the wet metallic surface of the treated valve and the wear-resistant powder to provide a hardface overlay raised valve seat, including a wear-resistant material and a hardface alloy.

* * * * *

UNITED STATES PATENT AND TRADEMARK OFFICE
CERTIFICATE OF CORRECTION

PATENT NO. : 4,776,566
DATED : October 11, 1988
INVENTOR(S) : Harry W. Girdley

It is certified that error appears in the above-identified patent and that said Letters Patent is hereby corrected as shown below:

Column 1, lines 64 and 65, "quarterturn" should read --quarter-turn--.

Column 6, line 48, "inerted" should read --inverted--.

Column 6, line 67, "wers" should read --wets--.

Column 7, line 1, "powered" should read --powdered--.

Column 6, line 55, "havig" should read --having--.

Signed and Sealed this

Thirteenth Day of June, 1989

Attest:

DONALD J. QUIGG

*Attesting Officer*   *Commissioner of Patents and Trademarks*